Nov. 26, 1957 B. V. VONDERSCHMITT 2,814,759
RASTER CENTERING CIRCUIT
Filed Oct. 25, 1954
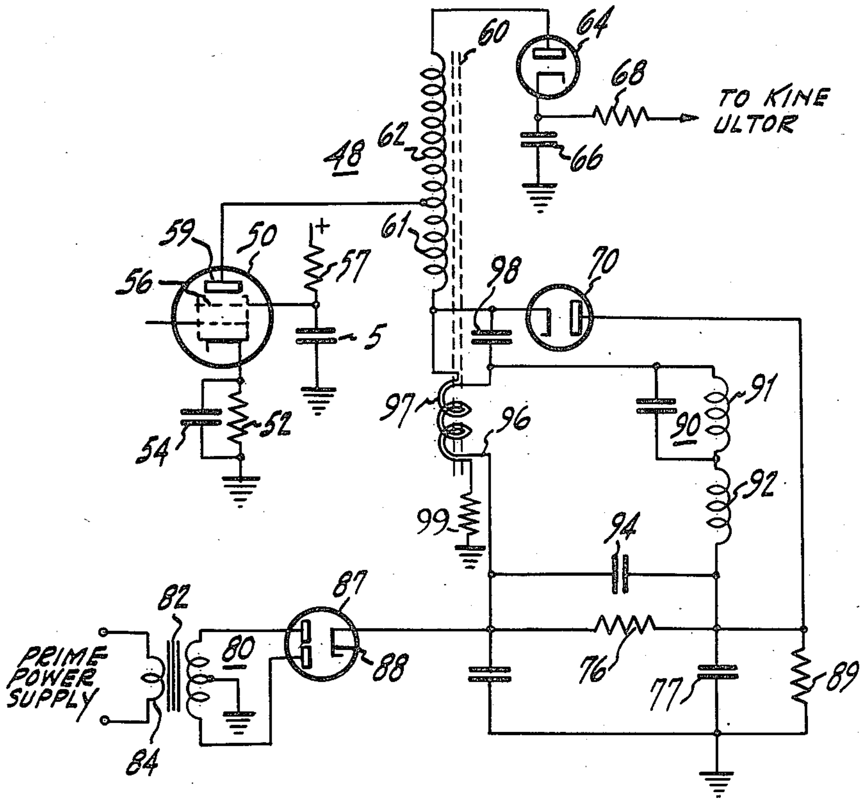
INVENTOR.
BERNARD V. VONDERSCHMITT
BY
[signature]
ATTORNEY United States Patent Office 2,814,759

Patented Nov. 26, 1957

2,814,759

RASTER CENTERING CIRCUIT

Bernard V. Vonderschmitt, Merchantville, N. J., assignor to Radio Corporation of America, a corporation of Delaware Application October 25, 1954, Serial No. 464,546

4 Claims. (Cl. 315—27)

The invention relates to deflection systems for television receivers, and it particularly pertains to circuit arrangements for centering the raster produced by an electron beam.

In present television practice an image is reproduced on the fluorescent screen of the cathode ray tube, or kinescope, by an electron beam which is deflected to trace successive lines forming a raster on the screen. Deflection of the electron beam may be accomplished magnetically or electrostatically. In the magnetic deflection system a sawtooth wave of current is applied to the windings of a deflection system arranged about the neck of the kinescope. Sawtooth deflection waves, generated by appropriate circuits in the television receiver, are amplified by a power amplifier device and are transferred by means of an output transformer to the deflection system windings.

Direct current flow in the output transformer windings has a detrimental tendency to saturate the magnetic core material of the output transformer which calls for an increase in size of the transformer core and thereby an increase in the cost of manufacture of both the transformer and the television receiver.

In some television receivers no circuit component is provided to adjust the linearity of the horizontal deflection. In normal and most efficient operation, the lack of such a component results in an increased scanning rate at the left side of the raster as compared to that on the right side. Thus the raster is decentered to the left when no centering correction is applied. In present day television receivers using electrostatic focus kinescopes, centering may be accomplished by using a centering magnet located immediately to the rear of the deflection system windings. Likewise, with magnetically focused kinescopes, centering may be accomplished by movement of the focused magnet or a portion thereof. Both of these methods of centering occasionally result in neck shadow because excessive movement is required toward the side of compressed linearity causing the beam to be interrupted by the neck of the kinescope.

Centering of the raster may be accomplished by controlled flow of direct current in the deflection system windings. The flow of this direct current may increase saturation of the transformer core or decrease saturation, depending upon the direction of the flow of the centering current with respect to the flow of anode current to the output amplifying tube. It is desirable to permit direct current to flow through the deflection system windings in either direction as dictated by the centering requirements. On the other hand, it is desired that the direct current flow through the output transformer be limited to the one direction in opposition to the flow of direction current to the anode of the amplifying tube to minimize adverse saturation.

An object of the invention is to provide improved means for introducing centering current in the deflection system windings without adversely saturating the output transformer.

Another object of the invention is to provide an improved circuit arrangement for obtaining centering current from the normal anode power supply source and thereby eliminate the necessity for a separate direct current source.

A further object of the invention is to incorporate means for obtaining boosted anode potential from the deflection transformer without the requirement of a high impedance low loss inductor.

Still another object of the invention is to provide boosted anode potential without requiring an auxiliary high impedance inductor which would normally be required with conventional deflection wave output transformers.

The objects of the invention are obtained in a horizontal deflection circuit arrangement for a television receiver having a deflection system including a deflection winding and a resistive element traversed by direct current obtained from the normal source of direct energizing potential. According to the invention a deflection transformer having more or less conventional primary and high voltage windings is also wound with a bifilar secondary winding comprising two conductors. One of the conductors and the deflection system winding are connected in series across the resistive element. A capacitor is connected between the one conductor and the primary winding to provide boosted anode voltage. The other of the bifilar winding conductors is connected to the voltage boosting capacitor to provide boosted potential to other circuit components requiring a potential greater than that furnished by the normal low voltage supply. The direction of direct current flowing in the one conductor of the bifilar winding is such as to oppose the saturation effect of the direct current through the primary winding to the amplifying tube anode which is applied by means of a damper tube connected between the primary winding and the positive pole of the energizing potential source. The resistance value of the resistive element is preferably initially adjusted to provide a nominal centering current which is within the approved manufacturing tolerances of the kinescopes to be used with the television receiver under consideration.

In order that the invention may be more clearly understood and readily put to practical use, a specific embodiment of the invention given by way of example only, is described below with reference to the accompanying drawing forming a part of the specification and in which:

The sole figure is a schematic diagram of a horizontal deflection circuit arrangement according to the invention.

In the sole figure there is shown a schematic diagram of a deflection wave and high voltage generating circuit arrangement for use with a television receiver otherwise comprising circuits which may be entirely conventional and which will be described to illustrate the setting of the invention. In such a receiver television signals appearing at an antenna are applied to a radio frequency wave amplifying circuit and the output therefrom is applied along with a wave obtained from a local beat oscillation generating circuit through a frequency changing circuit. The output of the frequency changing circuit is applied to an intermediate frequency amplifying circuit, which may be one amplifying picture signals only or both picture and sound signals. A demodulating circuit is coupled to the intermediate frequency amplifier for deriving a video wave from the television signals. The detected video signals are amplified in a video frequency amplifying circuit and thereafter applied to the input circuit of an image reproducing device or kinescope. Sound signals are derived from the frequency changing circuit, or from the intermediate frequency amplifying circuit, or from the demodulating circuit for further processing in a sound intermediate frequency amplifying circuit, an aural signal discriminating circuit, an audio frequency amplifying circuit and a transducer or speaker. The output of the video amplifying circuit is also applied to a synchronizing pulse separating circuit to separate the synchronizing pulses from the image information and the vertical synchronizing pulses from the horizontal. The separated vertical synchronizing pulses are applied to a vertical deflection wave generating circuit and the horizontal synchronizing pulses are applied to a horizontal deflection frequency wave and high voltage generating circuit 48. The vertical deflection generating circuit, the horizontal deflection and high voltage generating circuit are coupled to the kinescope to furnish the necessary vertical and horizontal deflection wave and ultor potentials. An automatic gain control (A.-G.-C.) amplifying and distributing network is coupled to the synchronizing pulse separating circuit, or to the video frequency demodulating circuit, to supply control potential to the desired ones of the circuits previously mentioned. Usually the R.-F. and the I.-F. circuits are at least so supplied.

Now referring specifically to the schematic diagram, sawtooth deflection waves from a horizontal deflection wave oscillator (not shown) are impressed on the control grid of a horizontal output amplifying electron discharge device shown here as a beam power pentode amplifying tube 50. Grid bias is afforded by means of a cathode resistor 52, shunted by a bypass capacitor 54, connected between the cathode and a point of fixed reference potential. The screen grid 56 is energized by means of a resistor 57 connecting the screen grid to a point of positive operating potential. The screen grid 56 is bypassed to the point of fixed reference potential by means of a capacitor 58. Deflection waves from the output amplifying tube 50 are applied to an output transformer 60 which includes a primary winding 61 to a terminal of which the anode 59 of the amplifying tube 50 and a high voltage winding 62 are connected. To the high voltage winding 62 there is connected the more or less conventional high voltage generating circuit comprising a high voltage rectifying device shown here as a high vacuum diode electron discharge device 64 which rectifies high voltage pulses appearing in the high voltage winding 62 and a high voltage capacitor 66 which stores the energy in the rectified pulses to provide the ultor of the kinescope with a continuous high voltage through the series resistor 68. Various oscillations which appear in the output transformer 60 are damped out by a damping device shown here as a high vacuum diode electron discharge tube 70 having a cathode connected to the other terminal of the primary winding 61 and an anode connected to a point of direct operating potential at the output of a filter network including a series section comprising a resistive element 76 and a shunt section comprising a capacitive element 77. The resistance element 76 may be in the form of a fixed resistor which may be used as a filter element or it may be the resistance component of a conventional choke inductor. The input of the filter network is connected to a conventional low power rectifier 80. This rectifier comprises a transformer 82 having a primary winding 84 connected to the usual 120, or 230, volt A.-C. electric power line and a secondary winding 86 connected to a high vacuum rectifier tube 87, the cathode 88 of which is the source of positive potential for the input to the filter network.

A load element 89 representing the low energizing potential load placed on the rectifier 80 by the remainder of the receiver is shunted across the output filter capacitor 77 of the filter network.

A deflection system 90, having a deflection system winding of two sections 91, 92 is connected at one terminal to the junction between the resistive element 76 and the capacitive element 77. The other terminal of the winding section 91 is connected to one conductor 96 of a bifilar secondary winding comprising two conductors 96, 97 arranged on the transformer 60. The other terminal of the conductor 96 is connected to the other terminal of the resistive element 76. A capacitor 98, serving as the anode voltage boosting, commonly termed "B boost," capacitor is connected between electrically similar terminals of the conductors 96, 97 the bifilar winding. Boosted potential is derived from the remaining terminal of the conductor 97 for application to load components in the receiver requiring higher energizing potential than the load element 89. The vertical deflection wave amplifier is an example of such a load component. These components are represented by the resistance component 99. A capacitor 94 is shunted across the resistive element 76 to improve the linearity.

The conductors 96, 97 forming the bifilar wound secondary have a total cross section of copper approximately equal to the cross section of a single secondary coil which would be used in a more conventional circuit. This is important so that the temperative is approximately the same as for a more conventional transformer. The winding 96 is so poled that direct current flowing therein, when correcting for centering as desired, opposes the saturatiton effect of direct current flowing in the primary winding 61.

Electron flow through the load element 89 passes through the deflection system winding sections 91, 92 through the bifilar conductor 96 and on to the cathode 88 of the rectifier 87 to provide the centering current desired. The degree of centering current is determined by the resistance value of the resistive element 76. This value may be adjusted by using a variable resistor but preferably is set in the design of the receiver under consideration so that the proper centering current is obtained within the tolerances of the kinescopes with which the set is intended to operate. Varying the amount of direct current flow in the one conductor 96 does not of course have any effect on the direct current flow in the other winding 97 and the bifilar arrangement of the conductor prevents any circulating A.-C. from developing.

The values of the components listed below, which were used in an application of the invention to a black-and-white television receiver with satisfactory results, are suggested as examples of circuits components for an initial investigation of practical applications of the invention.

| Ref. No. | Component | Type or Value |
|---|---|---|
| 50 | Amplifying tube | 6BQ6-GT. |
| 52 | Cathode resistor | 100 ohms. |
| 54 | Bypass capacitor | 0.25 mf. |
| 57 | Screen resistor | 10 ko. |
| 58 | Bypass capacitor | 0.25 mf. |
| 64 | Rectifying device | 1B3. |
| 66 | High voltage capacitor | 500 mmf. |
| 68 | Isolating resistor | 500 ko. |
| 70 | Damping device | 6AX4. |
| 80 | Rectifier | 504. |
| 76 | Resistive element | 40 ohms. |
| 77 | Capacitive element | 80 mf. |
| 89 | Load element | 2.5 ko. |
| 91, 92 | Deflection windings | 20 mh. |
| 94 | Linearity capacitor | 0.1 mf. |
| 98 | B boost capacitor | 0.068 mf. |

Obviously other values will be suggested to those skilled in the art for other applications of the invention.

The invention claimed is:

1. In a deflection circuit for a television receiver having a deflection system including a winding and a resistive element traversed by direct current, a deflection transformer having one winding comprising two bifilar wound conductors and another winding, means connecting one of said bifilar winding conductors, said deflection system winding and said resistive element in series circuit for direct current flow, means connecting said other winding, said other bifilar winding conductor and load apparatus in series for both direct and alternating current flow with polarity at which the magnetization due to the direct current flow in said other winding opposes that due to the direct current flow in said one conductor of said bifilar winding, and means to apply direct energizing potential between the junction of said other conductor and said other winding and a point of said load apparatus.

2. In a deflection circuit for a television receiver having a deflection system including a winding and a two-terminal resistive element traversed by direct current, a deflection transformer having one winding comprising two bifilar wound conductors and another winding, means connecting one of said bifilar winding conductors and said deflection system winding and said resistive element in closed loop series circuit for direct current flow, a damping electron discharge device having a cathode connected to one of the terminals of said other winding and an anode, a load element connected to the other terminal of said other bifilar conductor, means to apply direct energizing potential between the anode of said damping device and the other terminal of said load element, and means connecting said other winding to said one terminal of said other bifilar winding conductor with polarity at which the magnetization due to the direct current flow in said other winding opposes that due to the direct current flow in said one conductor.

3. In a horizontal deflection circuit for a television receiver having a deflection system including a winding and a two-terminal resistive element traversed by direct current, a deflection wave translating electron discharge device having an anode and a cathode, a deflection transformer having one winding comprising two bifilar wound conductors and another winding having a terminal connected to said anode and another terminal, means to apply direct energizing potential between the other terminal of said other winding and the cathode of said electron discharge device, means connecting one of said bifilar winding conductors, said deflection system winding and said resistive element in closed loop series circuit for direct current flow, said other winding being connected with respect to said one bifilar winding conductor so that the magnetization due to the direct current flow in said other winding opposes that due to the direct current flow in said one conductor, the other terminal of said other winding being connected to one terminal of said other bifilar winding conductor to induce an alternating wave in said bifilar winding, a load element connected for boosted potential between the other terminal of said other bifilar winding conductor and said cathode electrode.

4. In a horizontal deflection circuit for a television receiver having a deflection system including a winding and a two-terminal resistive element traversed by direct current, a deflection wave translating electron discharge device having an anode and a cathode returned to a point of fixed reference potential, a deflection transformer having one winding comprising two bifilar wound conductors and another winding having a terminal connected to said anode and another terminal, means including a damping electron discharge device having an anode connected to one of the termials of said resistive element and a cathode connected to the given terminal of said other conductor and said capacitor, to apply direct energizing potential between the other terminal of said other winding and the cathode of said electron discharge device, means connecting one of said bifilar winding conductors, said deflection system winding and said resistive element in closed loop series circuit for direct current flow, said other winding being connected with respect to said one bifilar winding conductor so that the magnetization due to the direct current flow in said other winding opposes that due to the direct current flow in said one conductor, the other terminal of said other winding being connected to one terminal of said other bifilar winding conductor to induce an alternating wave in said bifilar winding, a capacitance element interconnecting the one terminal of said other bifilar winding conductor and the terminal of said one conductor of like alternating potential, a load element connected for boosted potential between the other terminal of said other bifilar winding conductor and said point of fixed potential.

References Cited in the file of this patent

UNITED STATES PATENTS 2,598,134 Schade ---------------- May 27, 1952
2,701,851 Palmer ----------------- Feb. 8, 1955